United States Patent [19]

Brisson

[11] Patent Number: 5,142,252

[45] Date of Patent: Aug. 25, 1992

[54] AUDIO SIGNAL TRANSMISSION LINE WITH A LOW PASS FILTER

[76] Inventor: Bruce A. Brisson, 3037 Grass Valley Hwy., Auburn, Calif. 95603

[21] Appl. No.: 602,493

[22] Filed: Oct. 24, 1990

[51] Int. Cl.$^5$ .............................................. H01P 5/00
[52] U.S. Cl. ......................................... 333/4; 333/12; 333/24 R; 174/34
[58] Field of Search ................. 333/4, 5, 12, 181, 236, 333/24 R, 32, 245; 174/32, 34, 36, 115; 381/94

[56] References Cited

U.S. PATENT DOCUMENTS

| | | | |
|---|---|---|---|
| 773,472 | 10/1904 | Campbell | 333/236 X |
| 2,865,006 | 12/1958 | Sabaroff | 333/12 |
| 4,683,450 | 7/1987 | Max et al. | 333/12 X |
| 4,718,100 | 1/1988 | Brisson | 174/115 X |
| 4,885,555 | 12/1989 | Palmer | 333/12 |
| 4,945,189 | 7/1990 | Palmer | 333/236 X |
| 4,954,787 | 9/1990 | Brisson | 381/94 X |

*Primary Examiner*—Eugene R. LaRoche
*Assistant Examiner*—Seung Ham
*Attorney, Agent, or Firm*—Fliesler, Dubb, Meyer & Lovejoy

[57] ABSTRACT

An audio signal transmission line comprising an additional inductance inserted in series with the line and/or coupled in parallel therewith near the load end of the line for providing a low pass filter which overcomes parasitic and dielectric capacitance of the line so as to reduce audio frequency noise generated in the line by low level and low frequency audio signals. The magnitude of the inductance used may vary widely, e.g. from 20 microhenries to 1 millihenry, depending on the length of the line and the space available.

12 Claims, 1 Drawing Sheet

AUDIO SIGNAL TRANSMISSION LINE WITH A LOW PASS FILTER

BACKGROUND OF THE INVENTION

1. Field of the Invention

The present invention relates to audio signal transmission systems in general and in particular to an audio signal transmission line having a low pass filter circuit incorporated therein.

2. Description of the Prior Art

An audio signal transmission system comprises an audio signal generator and a load coupled to the generator by means of an audio signal transmission line. For example, the generator may comprise an acoustic transducer, such as a microphone, or an amplifier; the load may comprise an amplifier or a speaker; and the transmission line may comprise a pair of twisted or untwisted, single or multistrand wires or a coaxial cable.

Even in systems comprising expensive and high quality components, it has been found that signals generated in the audio frequency range for transmission to the load can generate noise in the audio frequency spectrum on conventional transmission lines and cables which can in turn result in a significant and detectable distortion of the audio signals being transmitted thereon.

SUMMARY OF THE INVENTION

The generation of noise in the audio frequency spectrum by audio signals placed on an audio transmission line or cable has been traced to transitions in the potential placed on the line. It has been found that when a low level, low frequency potential, such as a potential in the millivolt or microvolt range having a frequency of approximately 20 to 1500 Hz, is applied to an audio signal transmission line, particularly one coupled to a high impedance load, and goes from a negative potential to a positive potential, there is an instantaneous storage of charge in the distributed capacitance of the line. The capacitance may comprise the mutual or parasitic capacitance of multistrand wire as well as the capacitance due to dielectrics used in the line. When the charge discharges, high frequency noise, e.g. above 1 MHz, is generated. The high frequency noise, when it decays, produces a sustained low level, low frequency oscillation in the audio frequency spectrum on the line. To eliminate the undesired low level, low frequency oscillation, it has been found that by adding a compensating inductive element or network to the line, preferably on the load end thereof, the noise producing effect of the distributed capacitance is reduced if not substantially eliminated.

BRIEF DESCRIPTION OF THE DRAWINGS

The above and other objects, features and advantages of the present invention will become apparent from the following detailed description of the accompanying drawings, in which.

DETAILED DESCRIPTION OF THE INVENTION

The present invention is directed to an audio signal transmission line with low pass filtering for eliminating undesired low level, low frequency oscillation in an audio signal transmission system.

Figure 1:
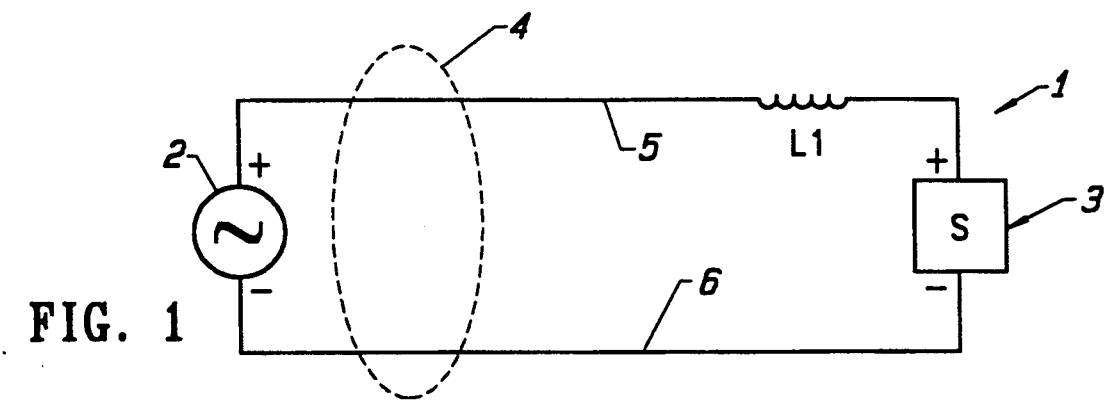
FIG. 1 is a schematic of an embodiment of the present invention.

Referring to FIG. 1, there is provided in accordance with the present invention an audio signal transmission system designated generally as 1. In the system 1 there is provided a source of audio signals 2 and a load 3 which is coupled to the source 2 by means of a pair of transmission lines designated generally as 4. The source 2 may be, for example, a microphone or other acoustic transducer, a preamplifier, an amplifier, or the like. The load 3 may be a preamplifier, an amplifier, a speaker, or the like. The transmission lines 4 may comprise a pair of twisted or untwisted, single or multistrand wires or a coaxial cable. As is conventional, the signal source 2 and the load 3 comprise a positive terminal and a negative terminal as shown by positive and negative signs, respectively. The transmission lines 4 comprise a first conductor or line 5 coupled between the positive terminals of the source 2 and load 3 and a negative conductor or return line 6 coupled between the negative terminals of the source 2 and the load 3. As thus far described, the source 2, load 3 and transmission lines 4 are conventional.

In accordance with the present invention there is provided in the system 1 an inductor L1 coupled in series with the line 5 between the source 2 and the load 3 and preferably near the end of the line 5 coupled to the load 3. For transmission lines 4 comprising lengths of approximately 3 meters, the inductance of inductor L1 is from 10-30 microhenries. In a working embodiment of the present invention, the inductor L1 comprised 20-22 microhenries. As will be further described below, the actual magnitude of the inductor L1 depends on the parasitic and distributed capacitance of the lines 4 which, for a 3 meter transmission line, is extremely small, e.g. 35 to 100 picofarads (pf) per foot.

Figure 2:
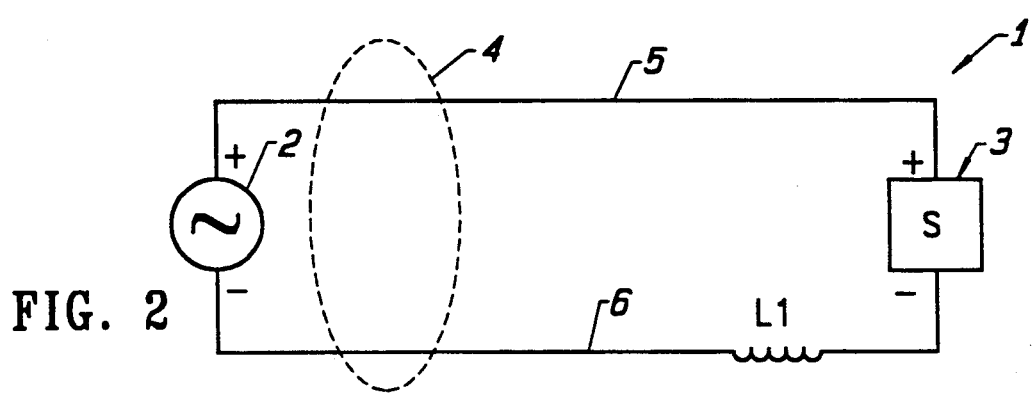
FIG. 2 is a schematic of another embodiment of the present invention.

Referring to FIG. 2 in another embodiment of the present invention, the inductor L1 is located on the load end of the transmission line 6.

Figure 3:
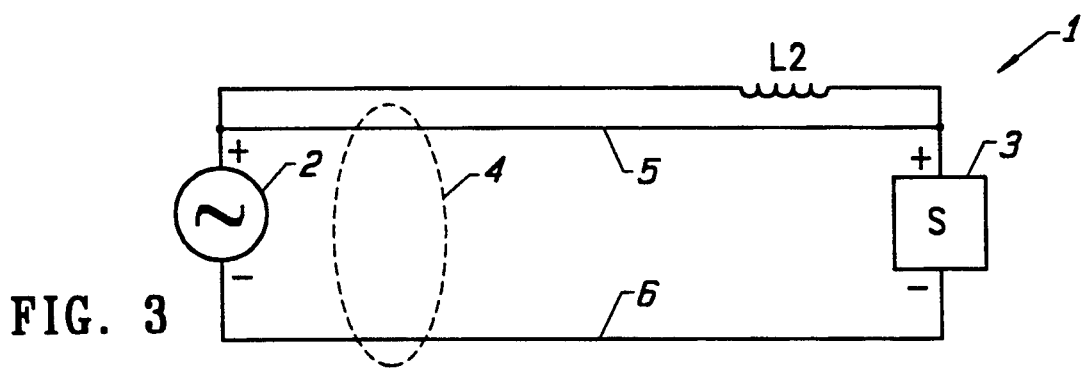
FIG. 3 is a schematic of still another embodiment of the present invention.

Referring to FIG. 3 there is provided in another embodiment of the present invention an inductor L2 which is coupled in parallel with the transmission line 5 near the load end thereof. The inductor L2 comprises an inductance of from 0.5 to 1.5 millihenries and may be as large as space will permit. In a working embodiment of the invention of FIG. 3, the inductor L2 comprised 1 millihenry.

Figure 4:
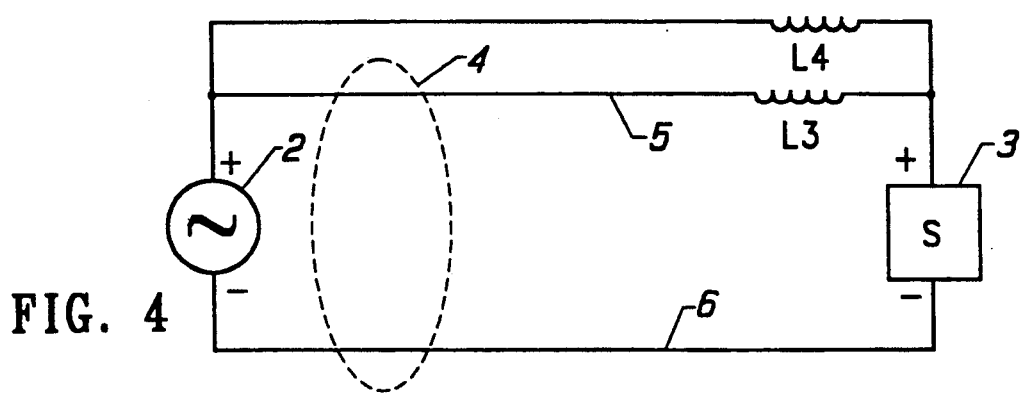
FIG. 4 is a schematic of still another embodiment of the present invention.

Referring to FIG. 4, there is provided in still another embodiment of the present invention an inductor L3 which is coupled in series with the line 5 between the source 2 and the load 3 preferably near the load end thereof, and an inductor L4 which is coupled in parallel with the line 5 and the inductor L3 near the load end thereof. In this embodiment of the present invention, the inductor L4 comprises an inductance of approximately 1 millihenry and the inductor L3 comprises an inductance of approximately 20 microhenries. In practice, the magnitude of the inductor L4 can be as large as space will permit.

As is well known, capacitance in series with a low frequency signal provides a large impedance to the signal whereas capacitance in series with a high frequency signal provides a low impedance to the signal.

The present invention is concerned with reducing the impedance to low frequency signals caused by the series capacitance in the transmission lines 4, especially in the positive leg thereof, line 5 and in the case of the apparatus of FIG. 2, line 6.

In practice, it has been found that the inductors L present a low impedance path to current flowing through the transmission line 5 until current builds up in the inductors. As the current increases in the inductors, the effects of the capacitance of the cable are reduced to such a level that the cable no longer appears capacitive but rather appears inductive and acts like a low pass filter. This current buildup is seen to occur as low level applied voltage, e.g. voltage in the millivolt and microvolt ranges, goes from a negative potential to a positive potential in the low audio frequency range, e.g. 20 to 1500 Hz Under these conditions, there is an instantaneous storage of charge in the distributed capacitance of the line which causes distortion in the audio frequency range when the charge is dissipated due to the above-mentioned low level, low frequency oscillation. The addition of inductance in the line as described above, provides a low pass filter and thereby reduces the storage of charge in the parasitic and dielectric capacitance of the lines. The reduction of this charge serves to reduce, if not eliminate, the noise which would otherwise be produced.

While preferred embodiments of the present invention are described above, it is contemplated that various modifications may be made thereto without departing from the spirit and scope of the present invention. For example, while the placement of the inductors L in the positive transmission line 5 near the load end of the line is preferred, placement of inductors L in the return line 6 and at other positions in the lines may provide some noise suppression. In addition, noise suppression in the audio frequency spectrum can be achieved by placing the inductor L in both the positive and the return lines. Accordingly, it is intended that the embodiments described be considered only as illustrative of the present invention and that the scope thereof should not be limited thereto but be determined by reference to the claims hereinafter provided and their equivalents.

What is claimed is:

1. An audio frequency signal transmission line comprising:
    a first conductor having a source end for coupling to the positive terminal of a source of audio frequency signals and a load end for coupling to the positive terminal of a load and a second conductor having a source end for coupling to the negative terminal of said source of audio frequency signals and a load end for coupling to the negative terminal of said load, each of said conductors having a distributed series capacitance and a distributed inductance; and
    a discrete inductor electrically coupled in series with said distributed series capacitance in at least one of said first and said second conductors near the load end thereof, said discrete inductor having a predetermined inductance for providing a low impedance signal path to low potential, low frequency audio frequency signals in said one conductor particularly when the load coupled thereto comprises a high impedance load.

2. An audio frequency signal transmission line according to claim 1 wherein said discrete inductor in series with said distributed series capacitance in at least one of said first and said second conductors near the load end thereof comprises a first discrete inductor and further comprising a second discrete inductor coupled in parallel with said first discrete inductor.

3. An audio frequency signal transmission line according to claim 1 wherein said discrete inductor in series with said distributed series capacitance in at least one of said first and said second conductors near the load end thereof comprises a discrete inductor for providing an inductance of from 10 to 30 microhenries in series with said distributed series capacitance in said first conductor near the load end thereof.

4. An audio frequency signal transmission line according to claim 2 wherein said first discrete inductor comprises an inductance of from 10 to 30 microhenries in series with said distributed series capacitance in said first conductor near the load end thereof and said second discrete inductor comprises an inductance of from 0.5 to 1.5 millihenries.

5. An audio frequency signal transmission line comprising:
    a first conductor having a source end for coupling to the positive terminal of a source of audio frequency signals and a load end for coupling to the positive terminal of a load and a second conductor having a source end for coupling to the negative terminal of said source of audio frequency signals and a load end for coupling to the negative terminal of said load, each of said conductors having a distributed series capacitance and a distributed inductance; and
    a discrete inductor electrically coupled in parallel with said distributed series capacitance in at least one of said first and said second conductors near the load end thereof, said discrete inductor having a predetermined inductance for providing a low impedance signal path to low potential, low frequency audio frequency signals particularly when the load coupled to said one conductor comprises a high impedance load.

6. An audio frequency signal transmission line according to claim 5 wherein said discrete inductor electrically coupled in parallel with said distributed series capacitance in at least one of said first and said second conductors near the load end thereof comprises a discrete inductor having an inductance of from 0.5 to 1.5 millihenries coupled in parallel with said first conductor.

7. A method of providing an audio frequency signal transmission line having a low impedance to low potential, low frequency audio frequency signals, said audio frequency signal transmission line having a first conductor with a source end for coupling to the positive terminal of a source of audio frequency signals and a load end for coupling to the positive terminal of a load and a second conductor with a source end for coupling to the negative terminal of said source of audio frequency signals and a load end for coupling to the negative terminal of said load, each of said conductors having a distributed series capacitance and a distributed inductance, comprising the step of:
    electrically coupling a discrete inductor in series with said distributed series capacitance in at least one of said first and said second conductors near the load end thereof for providing a low impedance signal path to low potential, low frequency audio frequency signals in said one conductor particularly when the load coupled thereto comprises a high impedance load.

8. A method according to claim 7 wherein said step of electrically coupling a discrete inductor in series with said distributed series capacitance in at least one of said first and said second conductors near the load end thereof comprises the step of coupling a discrete inductor having an inductance of from 10 to 30 microhenries in series with said distributed series capacitance in said first conductor.

9. A method according to claim 7 further comprising the step of electrically coupling a second discrete inductor in parallel with said discrete inductor in series with said distributed series capacitance in at least one of said first and said second conductors near the load end thereof.

10. A method according to claim 8 further comprising the step of electrically coupling a second discrete inductor having an inductance of from 0.5 to 1.5 millihenries in parallel with said discrete inductor coupled in series with said distributed series capacitance in said first conductor.

11. A method of providing an audio frequency signal transmission line having a low impedance to low audio frequency signals, said audio frequency signal transmission line having a first conductor with a source end for coupling to the positive terminal of a source of audio frequency signals and a load end for coupling to the positive terminal of a load and a second conductor with a source end for coupling to the negative terminal of said source of audio frequency signals and a load end for coupling to the negative terminal of said load, each of said conductors having a distributed series capacitance and a distributed inductance, comprising the step of:

electrically coupling a discrete inductor in parallel with at least one of said first and said second conductors near the load end thereof.

12. A method according to claim 11 wherein said step of electrically coupling a discrete inductor in parallel with at least one of said first and said second conductors near the load end thereof comprises the step of coupling a discrete inductor having an inductance of from 0.5 to 1.5 millihenries in parallel with said first conductor near the load end thereof.

* * * * *